UNITED STATES PATENT OFFICE.

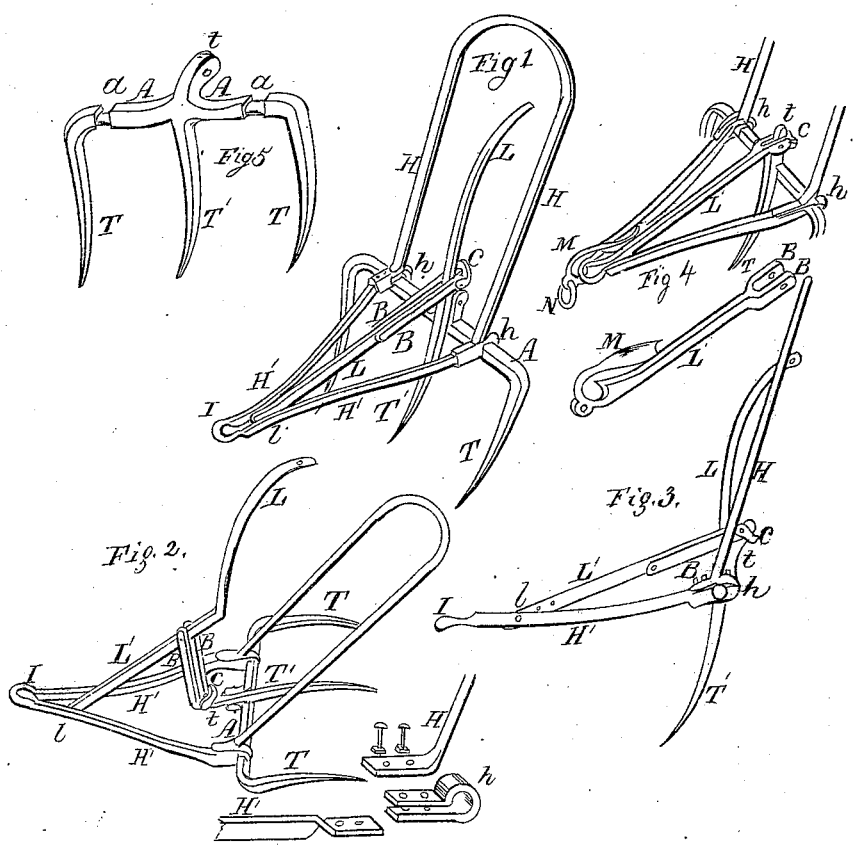

SIMON B. MINNICH, OF LANDISVILLE, PENNSYLVANIA.

IMPROVEMENT IN MANURE-HOOKS.

Specification forming part of Letters Patent No. 100,311, dated March 1, 1870.

*To all whom it may concern:*

Be it known that I, SIMON B. MINNICH, of Landisville, in the county of Lancaster and State of Pennsylvania, have made or invented certain Improvements on Manure-Hooks, of which the following is a specification.

The nature of my invention consists in the arrangement of the parts, to simplify the manner of unshifting, and to consolidate the hook, unite the handles, to protect the hands, and to adjust the inclination of the hook; also, the use of a clip to confine the hook and prevent it from turning up when unshifted; in short, to consolidate and simplify the construction.

The drawings clearly illustrate the several parts.

Figure 1 is a perspective view of the entire machine when in position for entering the manure; Fig. 2, the same unshifted for discharging the manure. Fig. 3 is a side view. Fig. 4 is simply to illustrate a modification of the lever L' as first made by forming a shoulder at the forward end, to rest against the union of the side or draft pieces, H', and provided with a hooked prolongation, M, and having the rear forked and bolted to the central prolongation, t, of the hook A, without the elbowed portion of the lever L, and operated for unshifting by simply bearing on the handles, which would disengage the shoulder and allow the united draft-pieces or tongue H' to rise upward while the hook is turned down to dislodge its contents. The hook M is to confine the united side pieces, H', from rising farther than is necessary for the sliding motion of the lever as pushed forward by the turning of the manure-hook A. Fig. 5 shows the consolidated hook, made by welding the tines T and cross-head A firmly together, which makes a more substantial hook.

The detached drawings illustrate the combination of the bow-handle H to the clips or bearings h and side pieces, H', to form the box or bearing at their union, all firmly bolted together.

The construction being clearly shown, the operation will be readily understood. The mode preferred and more particularly presented shows the lever L connected by a pivot between the approximate side or draft pieces, H', with an elbow propping against the central prolongation, t, of the hook A, thence turned up, forming a handle, L, of the continued lever. The lever is also provided on each side by a brace-piece, B, connected with the lever beyond the dead-center, or at such a point as to resist the pressure of the hook or draft; but when the lever is raised a short distance it will readily turn up between the side pieces, B', which form a link-connection with the lever-arm and prolonged head t of the hook A by a pivot-bolt. There is also a clip, C, which may be welded to the side braces, and united with them, or, with them, bolted together to the prolonged head t. The object of the clip is to prevent the hook from turning the tines up, so as to endanger the horse in backing or other coming in contact with them, the prolongation t being rounded or sloped in such a manner as to form a runner when returning with it discharged of its contents.

The lever-arm L' is also provided with a series of holes to shift the pivot for changing the inclination of the hook.

My object in illustrating the modification, Fig. 4, is to anticipate the idea of some one who might deem it an improvement, being originally my device. I further consider it as simply reversing the lever, so as to prop in front, bending the handle to form the hook M, and welding the side pieces, B, to the other end, and connecting them by a pivot-bolt with the prolongation or runner t, as substantially the same thing. I however confine my claims more particularly, as shown by Figs. 1 and 2.

The novelty in the central prolongation of the hook A consists in hinging it with the lever by a pivot-bolt, and the introduction of a clip, besides the other portions constituting the machine.

What I claim as my invention, and desire to secure by Letters Patent, is—

1. The lever L, when connected in its action with the curved prolongation t of the hook A by means of a hinge or pivot-bolt, in the manner and for the purpose specified.

2. The clip C, in combination with the prolongation t of the hook A, either hinged by a bolt, or in combination with the brace-pieces or link B, in the manner and for the purpose set forth.

3. In combination with the bow-handles H, side pieces or combined tongue H', and bearings h, the prolongation t of the hook, when the same is hinged substantially in the manner and for the purpose described.

SIMON B. MINNICH.

Witnesses:
WM. B. WILEY,
JACOB STAUFFER.